United States Patent
Rahkonen

(10) Patent No.: US 7,809,392 B2
(45) Date of Patent: Oct. 5, 2010

(54) TEXT AND VOICE CAPABLE MOBILE COMMUNICATION DEVICE

(75) Inventor: Tomas Rahkonen, Gustavsberg (SE)

(73) Assignee: Sony Ericsson Mobile Communications AB, Lund (SE)

( * ) Notice: Subject to any disclaimer, the term of this patent is extended or adjusted under 35 U.S.C. 154(b) by 373 days.

(21) Appl. No.: 11/302,334

(22) Filed: Dec. 14, 2005

(65) Prior Publication Data

US 2007/0135097 A1    Jun. 14, 2007

(51) Int. Cl.
*H04B 7/00* (2006.01)
*H04B 1/38* (2006.01)

(52) U.S. Cl. .............. 455/519; 455/564; 455/566; 455/518; 455/415

(58) Field of Classification Search .......... 455/564, 455/566, 412.2, 415, 518, 519
See application file for complete search history.

(56) References Cited

U.S. PATENT DOCUMENTS

| | | | |
|---|---|---|---|
| 6,418,328 B1 * | 7/2002 | Shon | 455/563 |
| 7,003,327 B1 * | 2/2006 | Payne et al. | 455/566 |
| 7,177,665 B2 * | 2/2007 | Ishigaki | 455/556.2 |
| 7,295,836 B2 * | 11/2007 | Yach et al. | 455/415 |
| 2003/0054864 A1 * | 3/2003 | Mergler | 455/566 |
| 2005/0143135 A1 * | 6/2005 | Brems et al. | 455/564 |
| 2005/0266889 A1 * | 12/2005 | Kuhl et al. | 455/564 |
| 2006/0058063 A1 * | 3/2006 | Bocking et al. | 455/556.2 |
| 2007/0035513 A1 * | 2/2007 | Sherrard et al. | 345/157 |

FOREIGN PATENT DOCUMENTS

| | | |
|---|---|---|
| EP | 0 881 802 A1 | 12/1998 |
| EP | 1 156 630 A1 | 11/2001 |
| EP | 1 601 169 A1 | 11/2005 |
| WO | 2005/107153 | 11/2005 |

OTHER PUBLICATIONS

International Search Report, Oct. 12, 2006, 3 pages.

* cited by examiner

*Primary Examiner*—Un C Cho
(74) *Attorney, Agent, or Firm*—Harrity & Harrity, LLP

(57) ABSTRACT

A method for establishing a call using a mobile terminal includes receiving a message. The method includes receiving a user input based on information in the message. The method includes accessing a communication identifier for a sending party identified in the message based on the user input. The method includes establishing a call using the communication identifier.

14 Claims, 6 Drawing Sheets

TEXT AND VOICE CAPABLE MOBILE COMMUNICATION DEVICE

BACKGROUND

1. Technical Field of the Invention

Implementations described herein relate generally to mobile communication devices and, more particularly, to a mobile communication device that can communicate using text and/or voice.

2. Description of Related Art

Mobile communication devices are used by a party to communicate with other parties. Mobile communication devices may be configured to allow voice communication, such as in a conventional telephone call between a cellular telephone and a destination. Mobile communication devices may also be configured to operate with text based messages, such as electronic mail (email) messages.

Mobile communication devices that can operate with both voice and text do not provide users with an interface that allows them to efficiently communicate via one medium when responding to a message received via another medium. For example, if a called party receives an email message, the conventional user interface on the mobile communication device does not allow the called party to place a voice call without first performing an undesirable and/or excessive number of interactions with the mobile communication device.

SUMMARY

According to one aspect, a mobile terminal is provided. The mobile terminal may include a display, a user interface, and logic. The logic may be configured to display at least a portion of a received message via the display and to receive a user input via the user interface. The logic may be configured to select a party identified in the received message based on the user input and to place a call to the selected party in response to the selecting. The logic may additionally be configured to receive the user input via a keypad, a control button, a microphone, or a stylus. The logic can further be configured to identify a party in the received message and to select a communication identifier for the identified party. The logic can further be configured to establish a communication link with a public switched telephone network (PSTN) or a packet based network. The logic can still further be configured to access a data structure and to retrieve a communication identifier that identifies the identified party from the data structure. The logic may further be configured to select the sender of the received message.

According to another aspect, a method for establishing a call using a mobile terminal is provided. The method may include receiving a message, receiving a user input, accessing a communication identifier for a sending party identified in the message based on the user input, and establishing a call using the communication identifier. The method may further include displaying at least a portion of the message on a display. The method may still further include displaying at least a portion of the message on a display, displaying an indicator with the message, identifying information in the message using the indicator, and accessing the communication identifier in response to the identified information. The method may further include accessing the communication identifier in response to a single action by a user. The method may still further include retrieving the communication identifier associated with a sender of the message. The method may yet further include dialing a telephone number associated with the party that sent the message or connecting to a network address associated with the party that sent the message. The method may further include displaying the message and selecting a sending party based on the user input. The method may still further include receiving a keypad input, a control button input, a microphone input, or a stylus input. The method may yet further include accessing a second communication identifier associated with another party identified in the message; and wherein the establishing may further comprise establishing a call with the another party.

According to yet another aspect, a computer readable medium that stores instructions executable by logic operating on a mobile terminal is provided. The computer readable medium may include instructions to display a received message, instructions to select a party identified in the received message based on a user input, instructions to select a communication identifier associated with the selected party, and instructions to establish a communication link with the selected party using the communication identifier. The computer readable medium may further include instructions to receive the user input via a keypad key, a control button, a microphone or a stylus. The computer readable medium may still further include instructions to identify a party in the displayed message using an identifier displayed proximate to information associated with the identified party. The computer readable medium may include placing a call to a telephone number via a public switched telephone network or a packet switched network.

According to still another aspect, a mobile terminal is provided. The mobile terminal may include means to receive a message, means to display at least a portion of the received message on the mobile terminal, means to identify a sender of the received message, means to identify a phone number associated with the identified sender, and means to place a call to the identified sender using the phone number in response to a single user input.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention.

The description to follow will describe a mobile communication device that can be embodied as a mobile terminal. As used herein, a "mobile communication device" and/or "mobile terminal" may include a radiotelephone; a personal communications system (PCS) terminal that may combine a cellular radiotelephone with data processing, a facsimile, and data communications capabilities; a personal digital assistant (PDA) that can include a radiotelephone, pager, Internet/intranet access, web browser, organizer, calendar, and/or global positioning system (GPS) receiver; and a laptop and/or palmtop receiver or other appliance that includes a radiotelephone transceiver.

Implementations of the mobile terminal described herein may be used with and/or applied to any cellular or wireless system utilizing air interfaces, such as global system for mobile communications (GSM), time division multiple access (TDMA), code division multiple access (CDMA) and/or frequency division multiple access (FDMA). Implementations of the mobile terminal described herein may further be used in wireless networks using other protocols, such as wireless Internet protocols. It should be further understood that the principles of the present invention may be utilized in hybrid systems that are combinations of two or more of the above air/wireless interfaces. In addition, a mobile terminal, in accordance with the present invention, may be designed to communicate with a base station transceiver using any standard based on GSM, TDMA, CDMA, FDMA, a hybrid of such standards, or any other standard.

Exemplary Mobile Communication Network

Figure 1:
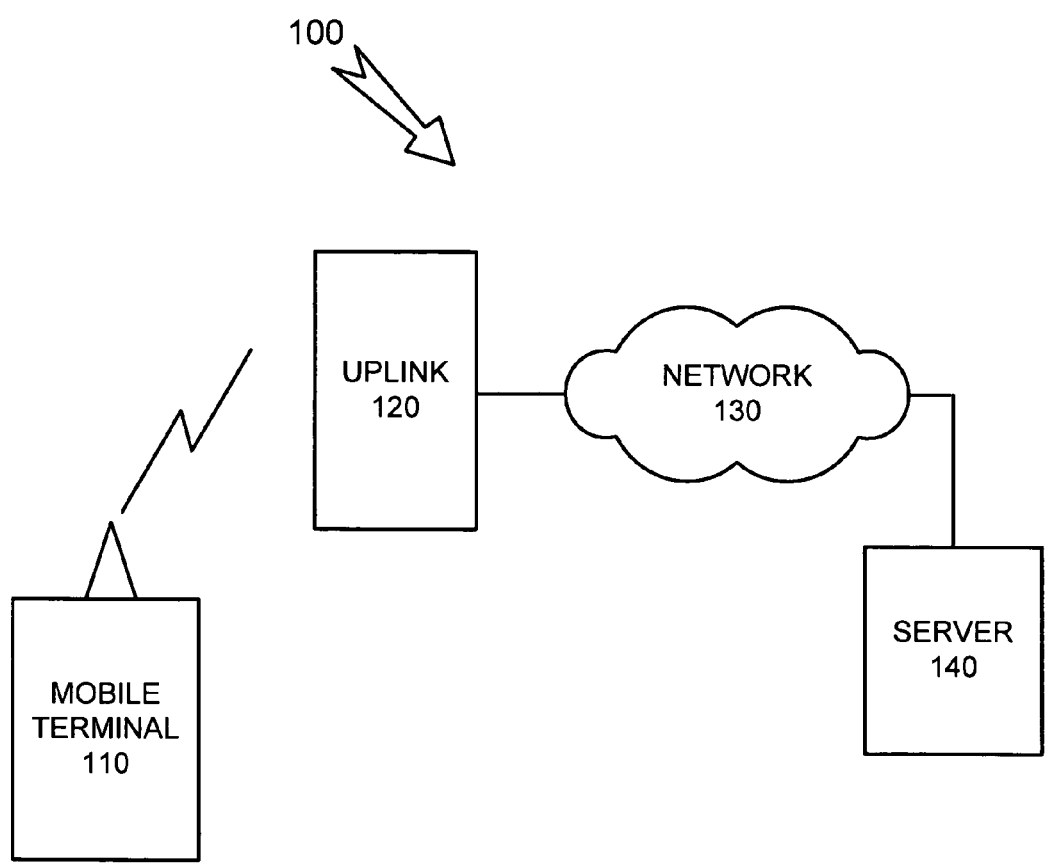
FIG. 1 is a diagram of an exemplary network in which methods and systems consistent with the principles of the invention may be implemented.

FIG. 1 is a diagram of an exemplary network in which systems and methods consistent with the principles of the invention may be implemented. As shown in FIG. 1, network 100 may include mobile terminal 110, uplink 120, network 130 and server 140. Mobile terminal 110 may include a portable communication device, such as the mobile terminal described above. Implementations of mobile terminal 110, consistent with the principles of the invention, may be configured to operate with voice, text, images, and video.

Uplink 120 may include one or more devices that interface mobile terminal 110 to another network or device, such as network 130 and/or server 140. For example, uplink 120 may connect mobile terminal 110 to a public switched telephone network (PSTN) and/or the Internet. Uplink 120 may include hardware and software for converting wireless signals into base band signals for transmission over physical links, such as copper conductors and/or optical fibers. Implementations of uplink 120 consistent with the principles of the invention may include devices such as a base transceiver station (BTS), a base station controller (BSC), a wireless access protocol (WAP) gateway, etc., known and used by those skilled in the relevant arts.

Network 130 may include a network, or combination of networks, capable of transporting analog data, such as non-digitized speech, and/or digital data, such as packets. For example, network 130 may include a voice-based network, such as the PSTN. Network 130 may also include packet data based networks such as a local area network (LAN), a metropolitan network (MAN), and/or a wide area network (WAN), such as the Internet. Network 130 may include hard-wired connections, such as shielded twisted pairs, coaxial cables, optical fibers, and/or waveguides. Alternatively, network 130 may include wireless links, such as free space optical links, and/or free space acoustic links. Network 130 may operate using substantially any protocol, such as asynchronous transfer mode (ATM), synchronous optical network (SONET), Internet Protocol (IP), or Bluetooth.

Server 140 may include a device capable of receiving data from another device or from a network. For example, server 140 may include a workstation, desktop computer, laptop computer, PDA, web enabled cellular telephone, Wi-Fi device, or an application specific processing device. In exemplary implementations described herein, server 140 may operate as a destination device by receiving data from mobile terminal 110 via an intermediate device, such as uplink 120. For example, server 140 may provide an email service to other devices on network 100, such as mobile terminal 110 and/or other client devices (not shown), such as a personal computer.

Exemplary Mobile Terminal Configuration

Figure 2:
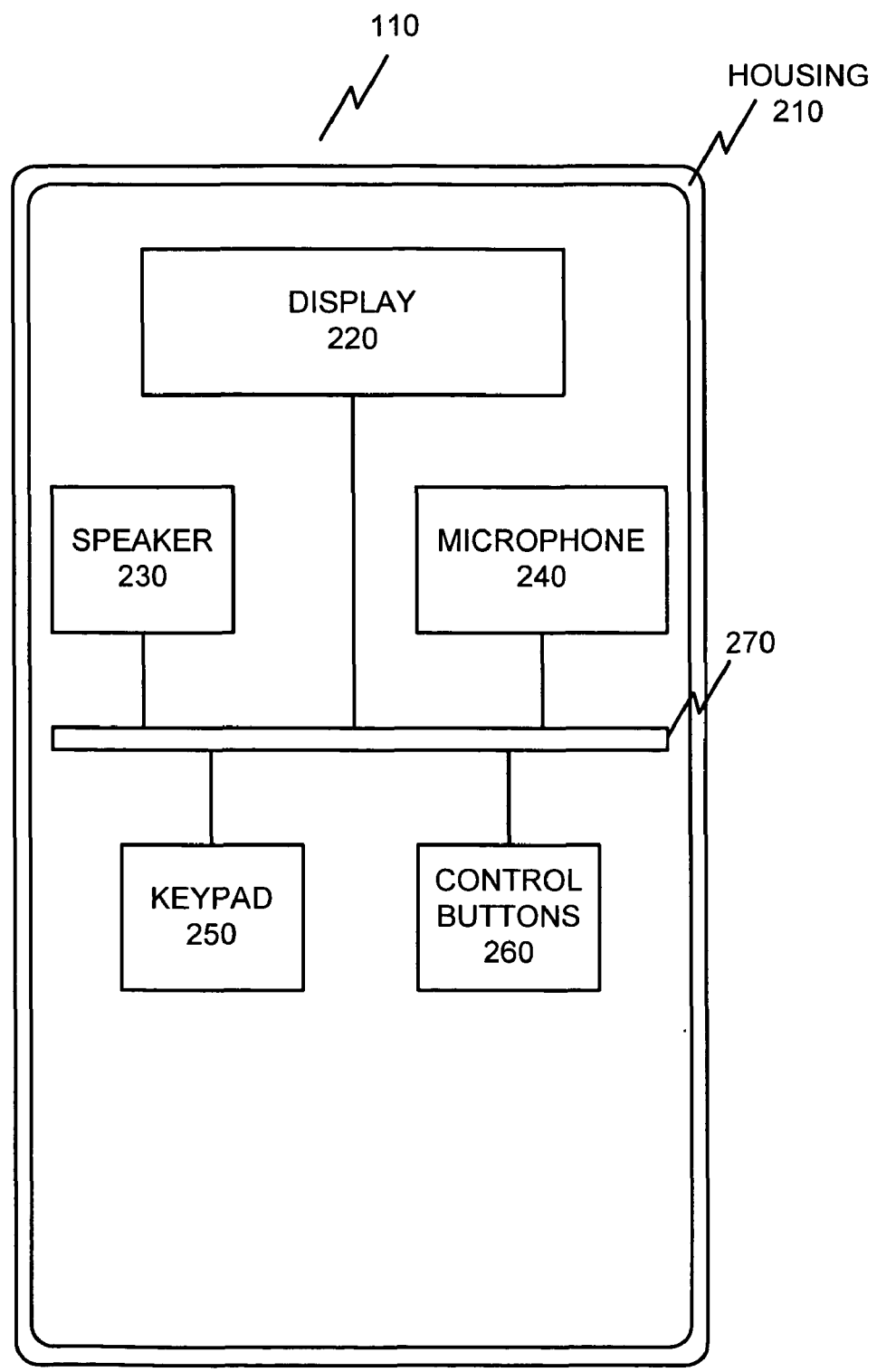
FIG. 2 is a diagram of an exemplary mobile terminal of FIG. 1.

FIG. 2 is an exemplary diagram of the mobile terminal of FIG. 1. Mobile terminal 110 may include housing 210, display 220, speaker 230, microphone 240, keypad 250 and control buttons 260. Housing 210 may protect the components of mobile terminal 110 from outside elements and/or may operate to provide an interface for mobile terminal 110 that facilitates user interaction therewith. Display 220 may provide visual information to the user. For example, display 220 may provide information regarding incoming and/or outgoing calls, or text messages. Display 220 may also provide for the display of images, video, games, a phonebook, current time, and/or device configuration parameter information. Speaker 230 may provide audible information to a user of mobile terminal 110. Microphone 240 may receive audible information, such as speech, from a user of mobile terminal 110.

Keypad 250 may include input devices, such as keys, configured to receive inputs from a user of mobile terminal 110. In one implementation, keypad 250 may include a standard telephone keypad. In other implementations, keypad 250 may include a stylus for interacting with a touch-sensitive implementation of display 220. Control buttons 260 may accept inputs from a user of mobile terminal 110. For example, control buttons 260 may allow a user to access menus, make selections associated with information displayed on display 220, and/or perform shortcut operations, such as selecting a phonebook entry and dialing a number associated with the selected entry. Bus 270 may interconnect components of mobile terminal 110.

Exemplary Functional Diagram

Figure 3:
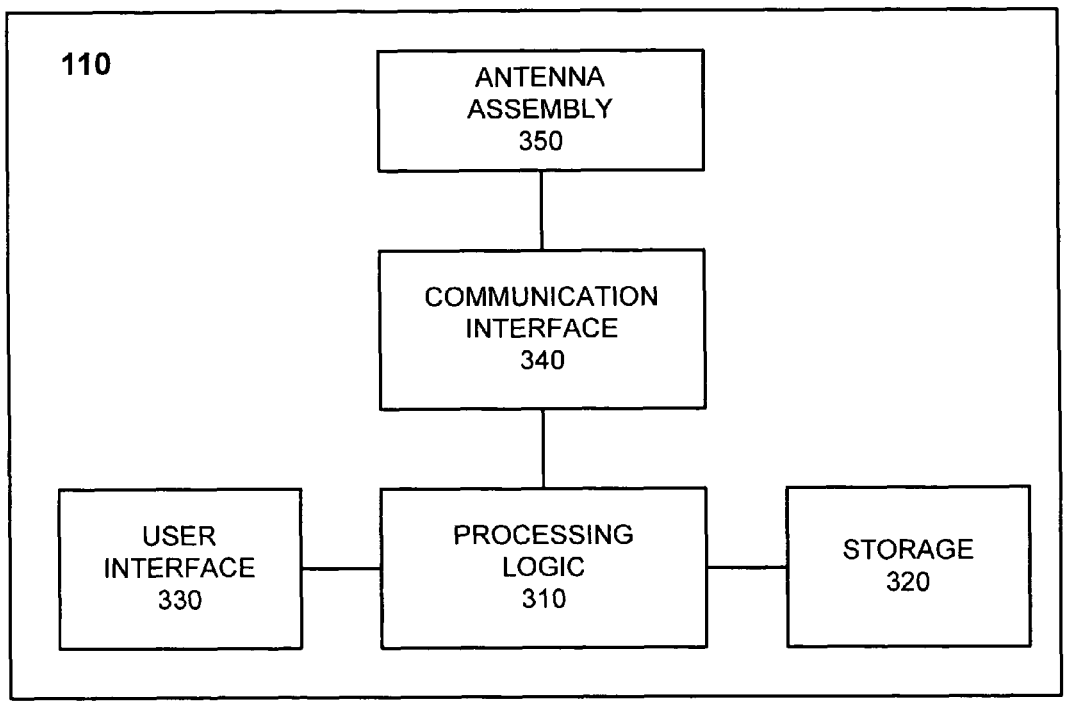
FIG. 3 is a functional diagram of exemplary components of the mobile terminal of FIGS. 1 and 2 consistent with the principles of the invention.

FIG. 3 is a functional diagram of exemplary components of the mobile terminal of FIGS. 1 and 2 consistent with the principles of the invention. As shown in FIG. 3, mobile terminal 110 may include processing logic 310, storage 320, user interface 330, communication interface 340, and antenna assembly 350.

Processing logic 310 may include a processor, microprocessor, an application specific integrated circuit (ASIC), field programmable gate array (FPGA), or the like. Processing logic 310 may include data structures or software programs to control operation of mobile terminal 110 and its components. Storage 320 may include a random access memory (RAM), a read only memory (ROM), and/or another type of memory to store data and instructions that may be used by processing logic 310.

User interface 330 may include mechanisms for inputting information to mobile terminal 110 and/or for outputting information from mobile terminal 110. Examples of input and output mechanisms might include a speaker (e.g., speaker 230) to receive electrical signals and output audio signals, a microphone (e.g., microphone 240) to receive audio signals and output electrical signals, buttons (e.g., control buttons 260 and/or keys of keypad 250) to permit data and control commands to be input into mobile terminal 110, a display (e.g., display 220) to output visual information, and/or a vibrator to cause mobile terminal 110 to vibrate.

Communication interface 340 may include, for example, a transmitter that may convert baseband signals from processing logic 310 to radio frequency (RF) signals. Communication interface 340 may also convert RF signals to baseband signals. Alternatively, communication interface 340 may include a transceiver to perform functions of both a transmitter and a receiver. Communication interface 340 may connect to antenna assembly 350 for transmission and reception of the RF signals. Antenna assembly 350 may include one or more antennas to transmit and receive RF signals over the air. Antenna assembly 350 may receive RF signals from communication interface 340 and may transmit the RF signals over the air. Antenna assembly 350 may also receive RF signals over the air and/or may provide them to communication interface 340. Implementations of antenna assembly 350 may be configured to operate with analog and/or digital RF signals.

As will be described in detail below, mobile terminal 110, consistent with the principles of the invention, may perform certain operations relating to placing outgoing calls in response to information associated with a displayed message, such as an email message. Mobile terminal 110 may perform these operations in response to processing logic 310 executing software instructions contained in a computer-readable medium, such as storage 320. A computer-readable medium may be defined as a physical or logical memory device and/or carrier wave.

The software instructions may be read into storage 320 from another computer-readable medium or from another device via communication interface 340. The software instructions contained in storage 320 may cause processing logic 310 to perform processes that will be described later. Alternatively, hardwired circuitry may be used in place of or in combination with software instructions to implement processes consistent with the principles of the invention. Thus, implementations consistent with the principles of the invention are not limited to any specific combination of hardware circuitry and software.

Exemplary Data Structure

Figure 4:
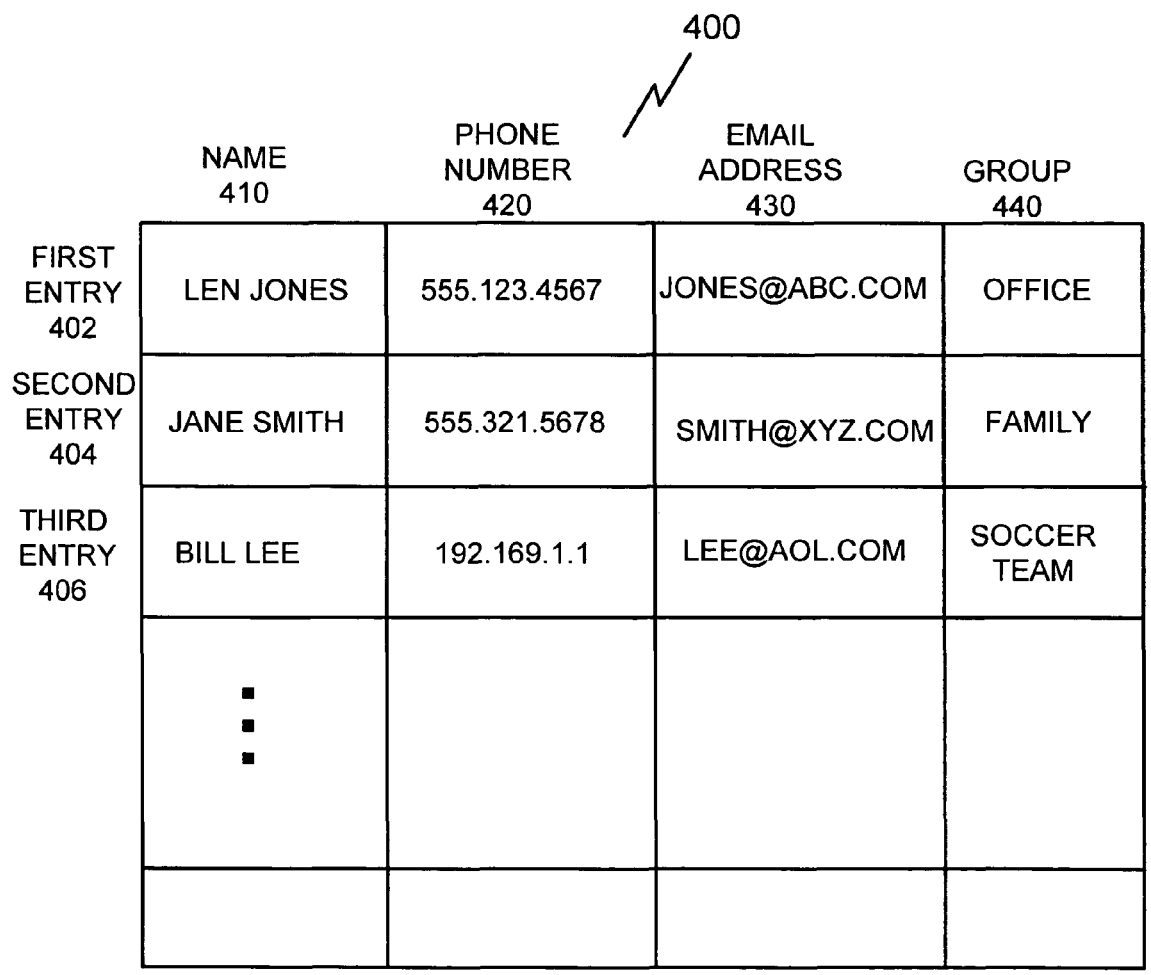
FIG. 4 illustrates an exemplary data structure for storing information on the mobile terminal of FIGS. 2-3 consistent with the principles of the invention.

FIG. 4 illustrates an exemplary data structure for storing information in mobile terminal 110 consistent with the principles of the invention. Data structure 400 may include any mechanism or technique that can be used to store information in a computer-readable medium. In an exemplary implementation, data structure 400 may be used to store contact information associated with parties that a user of mobile terminal 110 may wish to contact. In one implementation, data structure 400 may store information associated with a phonebook residing on mobile terminal 110. The phonebook may include information associated with parties that a user of mobile terminal 110 can contact without the need to manually enter a phone number. For example, a phonebook may include communication identifiers that are associated with names of persons stored in the phone book. A "communication identifier" may include any mechanism or technique that can be used to identify and contact a destination device.

In an exemplary implementation, data structure 400 may include name field 410, phone number field 420, email address field 430, and group field 440. Data structure 400 may arrange information in a row and column format to facilitate interpretation by a user of mobile terminal 110. Fields 410-440 may designate columns into which information associated with parties is arranged by rows.

Name field 410 may include information used to identify a party associated with a phone number 420, email address 430, or group 440. For example, name field 410 may include the name of a party, such as Jane Smith (entry 404). Phone number field 420 may include information that identifies a communication identifier, such as a phone number, or other identifier, that can be used to place a call to a party associated with the phone number. For example, phone number field 420 can include screen names, instant messaging addresses, Internet protocol (IP) addresses, etc., associated with a party identified in name field 410. In one implementation consistent with the principles of the invention, phone number field 420 may include an IP address such as 192.169.1.1 (e.g., in third entry 406). An IP address may be associated with, for example, an IP-phone used by a party identified in field 410 to send an email message to mobile terminal 110. Alternatively, a user of an IP-based phone may have a conventional telephone number as well as an associated IP address.

Email address field 430 may include information that identifies a communication identifier, such as an email address, or other identifier, that can be used to send a message to a party. For example, a user of mobile terminal 110 may use an email address to send a text message to a party. Group field 440 may include information that allows a user of mobile device 110 to associate multiple parties together under a heading. For example, a user may associate persons in his/her family into a group labeled "family." The family group may be accessed by the user so that the user can, for example, send a message or place a call to one or more members of the family group using a limited number of actions. Group field 440 may also let the user associate other groups to persons identified in data structure 400, such as persons working with the user (e.g., "office") and/or persons playing on a sports team with the user (e.g., "soccer team").

Information associated with a party may be arranged as an entry 402-406 in data structure 400 to facilitate access by a user and/or by processing logic 310.

Exemplary Implementation

Figure 5:
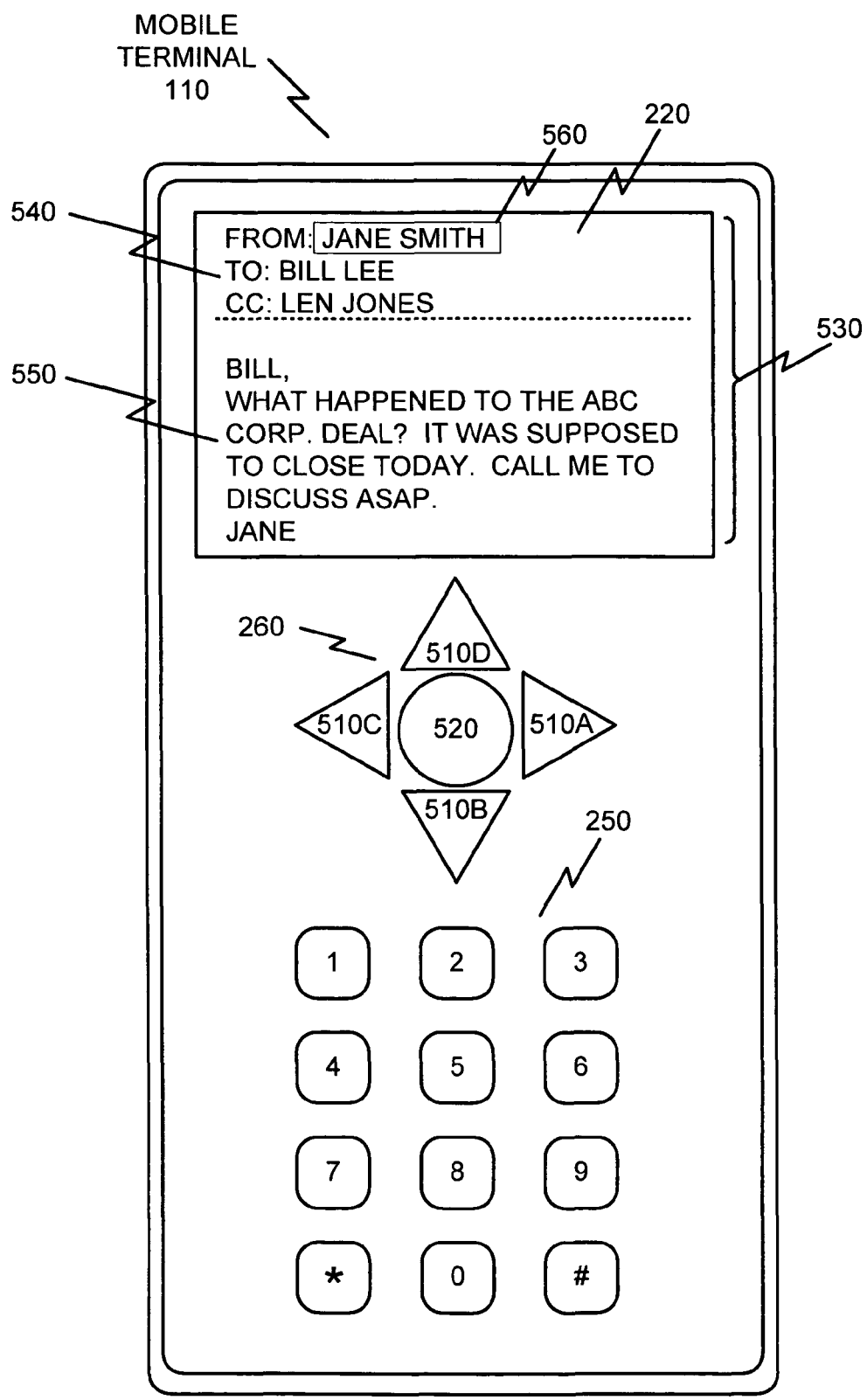
FIG. 5 illustrates a text message displayed on the mobile device of FIGS. 2-3 consistent with the principles of the invention.

FIG. 5 illustrates a text message displayed on the mobile device of FIGS. 2-3 consistent with the principles of the invention. Mobile terminal 110, as illustrated in FIG. 5, may include direction buttons 510A-510D and selection button 520 as part of control buttons 260. Mobile terminal 110 may also include a text message 530 (hereinafter "message 530") that may include header portion 540 and body portion 550. Message 530 may further include a selection identifier 560 (hereinafter "identifier 560").

Direction buttons 510A-510D may include mechanisms that cause a cursor, text, and/or identifier 560, etc. to move within display 220. For example, depressing button 510A may cause a cursor to move to the right in display 220 and depressing button 510B may cause the cursor to move toward the bottom of display 220. Selection button 520 may include a mechanism that causes an item, or piece of information, identified by a marking device, such as identifier 560, to be selected. For example, depressing selection button 520 may operate as an "Enter" command or "Select" command. Depressing selection button 520 may also operate to place a call to a called party when a number of the called party is dialed using keypad 250, spoken into microphone 240, or selected via identifier 560.

Message 530 may include information in a human-readable and/or audible form. For example, message 530 may include text, figures, images, and or audible content, such as audible content generated by a text-to-speech application running on mobile terminal 110. Message 530 may include a header portion 540 that includes information identifying a sender, recipient(s), time, date, transmission path, etc. For example, header portion 540 may identify the sender of message 530, persons receiving carbon copies of message 530 and/or an intended recipient of message 530. Body portion 550 may include information that conveys a message to a user of mobile device 110. For example, body portion 550 may include the contents of a message to a recipient identified in header portion 540. Identifier 560 may be an indicator, such as a highlighted box, bolded text, or some other indicator that allows a user of mobile terminal 110 to visually determine a selected item, name, etc.

Exemplary Process

Figure 6:
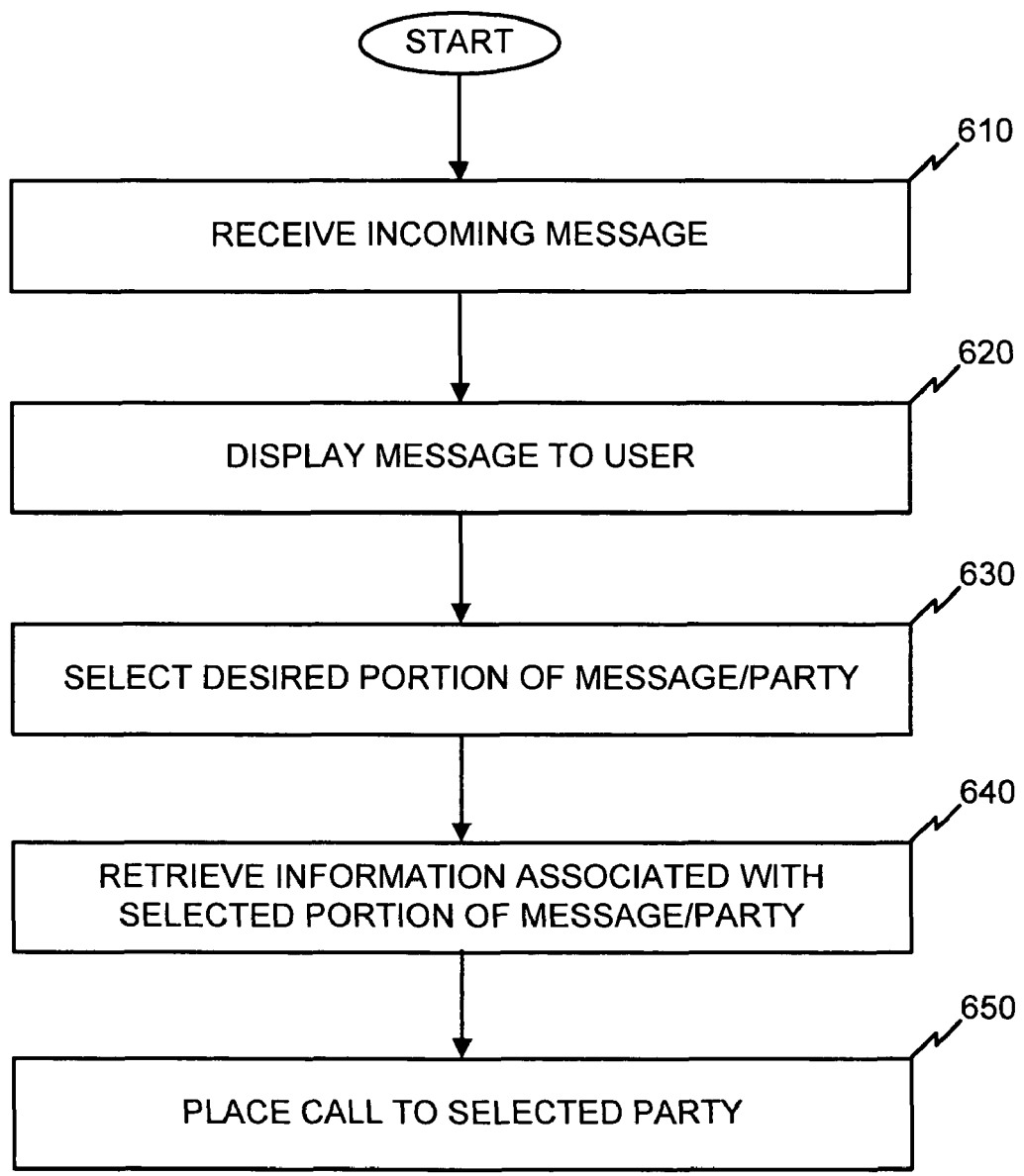
FIG. 6 is a flowchart of exemplary processing consistent with the principles of the invention.

FIG. 6 is a flowchart of exemplary processing consistent with the principles of the invention. Processing may commence when a message is received at mobile terminal 110 (act 610). For example, a sender may originate an email message and may send the message via server 140. Server 140 may send the message to uplink 120 via network 130, and uplink 120 may convert the message to a wireless-compatible format. Uplink 120 may make the message available to mobile terminal 110 in the wireless-compatible format.

The received email message may cause an alert to be provided to a user of mobile terminal 110. For example, mobile terminal 110 may vibrate and/or may make an audible signal available to the user via speaker 230. In addition, a visual indicator may be displayed on display 220 to indicate that an email message has been received.

The email message (e.g., message 530) may be displayed in display 220 in response to a user input (act 620). For example, the user may depress a key, such as selection button 520, to cause the new message to be displayed in display 220. In another implementation, the user may cause the email message to be displayed by speaking into microphone 240. In response to the user input, message 530 may be displayed in display 220. As discussed previously, a displayed message 530 may include header portion 540 and body portion 550 as illustrated in FIG. 5. In the exemplary message of FIG. 5, header portion 540 may identify the sender as Jane Smith, the recipient as Bill Lee and Len Jones as receiving a carbon copy. Body portion 550 may include a message to Bill Lee from Jane Smith. In the message, Jane Smith may request that Bill Lee contact her. Displayed messages may include text, images, or video. For example, an incoming message may display an image of the sender instead of the sender's name along with body portion 550.

The user may move indicator 560 across portions of displayed message 530. For example, the user may move indicator 560 into header portion 540 and over a name associated with a sender of the email message, such as Jane Smith (FIG. 5). When identifier 560 is over a desired portion of message 530, the user may depress a button/key, such as selection button 520, to select the identified portion of message 530 (act 630). For example, the user may depress selection button 520 when indicator 560 is over Jane Smith. Processing logic 310 may then receive the selected information (i.e., Jane Smith in this example).

Processing logic 310 may access data structure 400 and identify an entry corresponding to the selected information (act 640). In this example, processing logic 310 may identify entry 404 as corresponding to Jane Smith. Processing logic 310 may also retrieve information associated with Jane Smith. For example, processing logic 310 may retrieve the phone number 555.321.5678 in phone number field 420 of entry 404 in response to the user's selection of Jane Smith using selection button 520 and identifier 560.

Processing logic 310 may place a call to Jane Smith's phone number (555.321.5678) (act 650). Processing logic 310 may dial Jane Smith's phone number without further user interaction, such as by dialing Jane Smith's number substantially coincident with accessing data structure 400 in response to the user selecting Jane Smith via identifier 560. In another implementation, processing logic 310 may cause information to be displayed on display 220 prior to placing the call to Jane Smith. For example, processing logic 310 may display "Place Call to Jane Smith? Depress '1' for YES or '2' for NO," on display 220. In response to the prompt, the user may depress "1" to place a call to Jane Smith or may depress "2" to abort placing a call to Jane Smith. Implementations of mobile terminal 110 may allow the user to select Jane Smith and to place a call to Jane Smith via spoken commands instead of, or in addition to, commands entered via control buttons 260 or keypad 250. In an Internet protocol based (IP-based) implementation, mobile terminal 110 may place a voice over Internet protocol (VoIP) call to an IP-compatible device, such as a lap top, associated with Jane Smith. In still other alternatives, identifier 560 may not be needed. For example, when an email is displayed in display 220, the user of mobile terminal 110 may press a dial key or may speak the word "call" into microphone 240. In this case, mobile terminal 110 will identify the sender of the email message, access data structure 400, determine a phone number of the sending party, and dial that party's phone number, without the need for the user to select a portion of the email message. In another implementation of mobile terminal 110, a user's inbox may show a number of messages. The user may press a dial key or may speak the word "call" to select one of the messages and dial a phone number associated with the sender of the message. In this implementation, body portion 550 may not be displayed in display 220.

Implementations of mobile terminal 110 may allow the user to select other parties associated with message 530, such as Len Jones. A user may select Len Jones by moving indicator 560 over Len Jones and depressing selection button 520. Implementations of mobile terminal 110 may also let the user select a group 440 that is associated with a party identified in message 530. For example, if the user selects Jane Smith, display 220 may present "Select Jane's group(s)? Depress '1' for YES or '2' for NO." If the user depresses "1" on keypad 250, the user may be able to place a conference call to all parties identified in the selected group 440. Alternatively, the user may display the parties in the selected group and may select one or more parties associated with Jane Smith's group using identifier 560. Mobile terminal 110 may then place a call to those selected parties.

Conclusion

Implementations consistent with the principles of the invention may facilitate placing a call to a party associated with a message.

The foregoing description of preferred embodiments of the invention provides illustration and description, but is not intended to be exhaustive or to limit the invention to the precise form disclosed. Modifications and variations are possible in light of the above teachings or may be acquired from practice of the invention.

For example, the present invention may be embodied as cellular communication systems, methods, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system.

In the context of this document, a computer-usable or computer-readable medium may be any medium that can contain, store, communicate, propagate, or transport the program for use by or in connection with the instruction execution system, apparatus, or device. The computer-usable or computer-readable medium may be, for example but not limited to, an electronic, magnetic, optical, electromagnetic, infrared, or semiconductor system, apparatus, device, or propagation medium. More specific examples of the computer-readable medium may include, but are not limited to, the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Consistent with the principles of the invention, computer-usable or computer-readable medium may include paper and/or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While series of acts have been described with regard to FIG. 6, the order of the acts may be modified in other implementations consistent with the principles of the invention. Further, non-dependent acts may be performed in parallel.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects were described without reference to the specific software code—it being understood that one of ordinary skill in the art would be able to design software and control hardware to implement the aspects based on the description herein.

It should be emphasized that the term "comprises/comprising" when used in this specification and/or claims is taken to specify the presence of stated features, integers, steps or components but does not preclude the presence or addition of one or more other features, integers, steps, components or groups thereof.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A mobile terminal, comprising:
   a display;
   a user interface; and
   a processor to:
      display, via the display, a plurality of graphical representations associated with, respectively, a plurality of received messages,
      receive, via the user interface, a user input to select one of the plurality of graphical representations, and
      automatically place, in response to receiving the user input and without receiving another user input, a conference call based on the one of the plurality of received messages associated with the selected one of the plurality of graphical indications, where the processor, when placing the conference call, is further to automatically:
         identify a sender and one or more other recipients of the one of the plurality of received messages,
         determine that at least one of the sender or the one or more other recipients is associated with a group,
         retrieve stored contact information for each of the sender, the one or more other recipients, and parties of the group, and
         establish, based on the retrieved stored contact information, the group conference call to the sender, the one or more other recipients, and the parties of the group.

2. The mobile terminal of claim 1, where the user input corresponds to a voiced call command.

3. The mobile terminal of claim 1, where, when placing the conference call, the processor is further to:
   establish a communication link with at least one of a public switched telephone network (PSTN) or a packet based network.

4. The mobile terminal of claim 1, where when placing the conference call, the processor is to:
   access a data structure; and
   retrieve a communication identifier corresponding to the sender, the other recipients, or parties in the group, from the data structure.

5. The mobile terminal of claim 1, where the processor, when establishing the conference call, is further to:
   determine that the retrieved stored contact information for at least one of the sender, the one or more other recipients, or the parties of the group is associated with a telephone number;
   determine that the retrieved stored contact information for at least one other of the sender, the one or more other recipients, or the parties of the group is associated with a network address;
   dial the telephone number; and
   connect to the network address via a voice over internet protocol (VoIP) connection.

6. The mobile terminal of claim 1, where at least one of the sender or the one or more other recipients is not associated with the group.

7. A method performed by a mobile terminal, the method comprising:
   receiving a message;
   receiving a user input to establish a conference call based on the received message; and
   automatically placing, in response to receiving the user input and without receiving another user input, the conference call, where automatically placing the conference call includes:
      identifying a sender of the received message and one or more other recipients of the received message,
      determining that at least one of the sender or the one or more other recipients is associated with a group, where at least one of the sender or the one or more other recipients is not associated with the group;

accessing a communication identifier for each of the sender, the one or more other recipients, and parties in the group; and establishing, based on the accessed communication identifiers, the conference call to the sender, the one or more other recipients, and the parties of the group.

8. The method of claim 7, where establishing the conference call further comprises:

determining that one of the communication identifiers is associated with a telephone number;

determining that another of the communication identifiers is associated with a network address;

dialing the telephone number; and connecting to the network address via a voice over internet protocol (VoIP) connection.

9. The method of claim 7, where receiving the user input includes:

receiving a microphone input corresponding to a voice call command.

10. A memory device that stores instructions executable by a processor operating on a mobile terminal, the memory device comprising:

instructions to display a plurality of graphical representations associated, respectively, with a plurality of received messages;

instructions to highlight one of the plurality of graphical representations in response to user control of a movable indicator; and instructions to place, in response to a user input and without another user input, a conference call based on one of the plurality of received messages associated with the highlighted one of the plurality of graphical representations, where the instructions to place the conference call include:

instructions to identify a sender and one or more other recipients of the one of the plurality of received messages, instructions to determine, in response to the user input, that at least one of the sender or the one or more other recipients is a member of a group, where at least one of the sender or the one or more other recipients is not associated with the group;

instructions to retrieve stored communication identifiers associated with, respectively, the sender, the one or more other recipients, and parties of the group, and instructions to establish communication links with each of the sender, the one or more other recipients, and the parties in the group using the respective communication identifiers, where the instructions to establish the communication links include:

instructions to determine that one of the communication identifiers is associated with a telephone number, instructions to determine that another of the communication identifiers is associated with a network address, instructions to dial the telephone number, and instructions to connect to the network address via a voice over internet protocol (VoIP) connection.

11. The memory device of claim 10, further comprising:

instructions to receive the user input, which include instructions to receive a voice input via a microphone, the voice input corresponding to a call command.

12. The computer readable memory device of claim 10, where the plurality of graphical representations identify the corresponding senders for each of the plurality of received messages.

13. The memory device of claim 10, where the instructions to establish comprise:

instructions to dial the telephone number via a public switched telephone network, and instructions to connect to the network address, through the VoIP connection, over a packet switched network.

14. A mobile terminal, comprising:

means for receiving a message;

means for receiving a user input to establish a conference call based on the received message; and means for automatically placing, in response to receiving the user input and without receiving another user input, the conference call, where the means for automatically placing the conference call include:

means for identifying a sender of the received message and one or more other recipients of the received message, means for determining that at least one of the sender or the one or more other recipients is associated with a group, where at least one of the sender or the one or more other recipients is not associated with the group, means for accessing communication identifiers associated, respectively, with each of the sender, the one or more other recipients, and parties in the group, and means for establishing, based on the communication identifiers, the conference call to the sender, the one or more other recipients, and the parties in the group.

* * * * *